July 14, 1970 T. O. PAINE 3,520,190
DEPUTY ADMINISTRATOR OF THE NATIONAL AERONAUTICS AND SPACE ADMINISTRATION
DIFFERENCE CIRCUIT
Filed May 21, 1968
FIG. 1
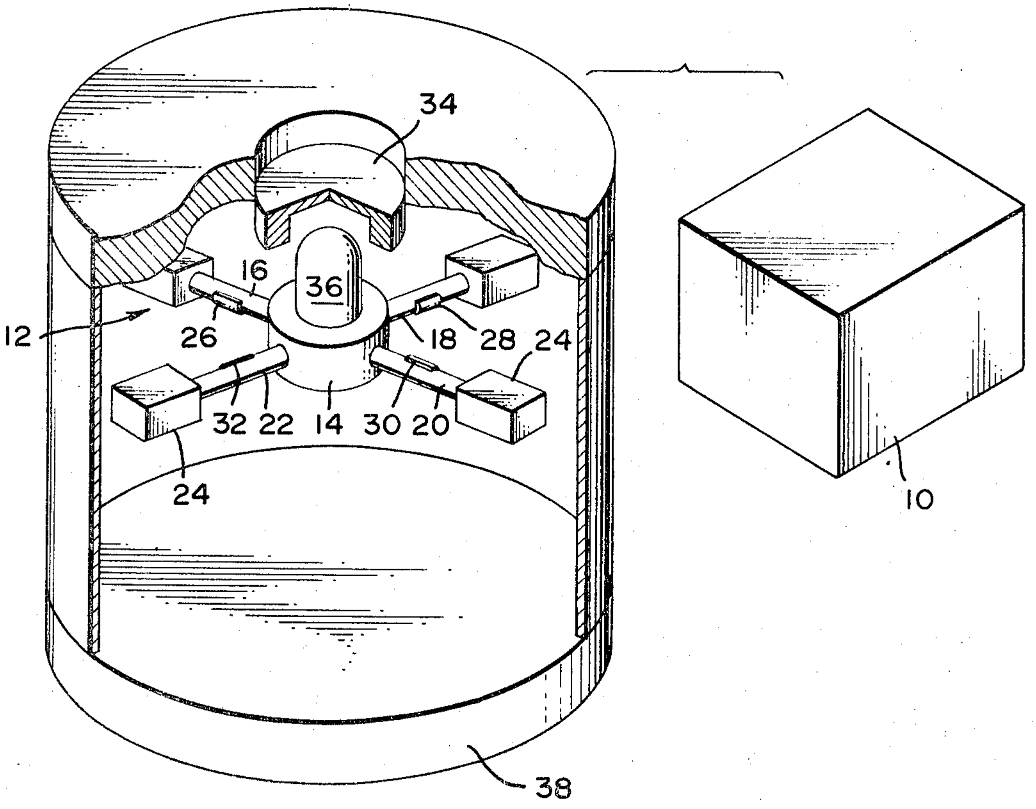
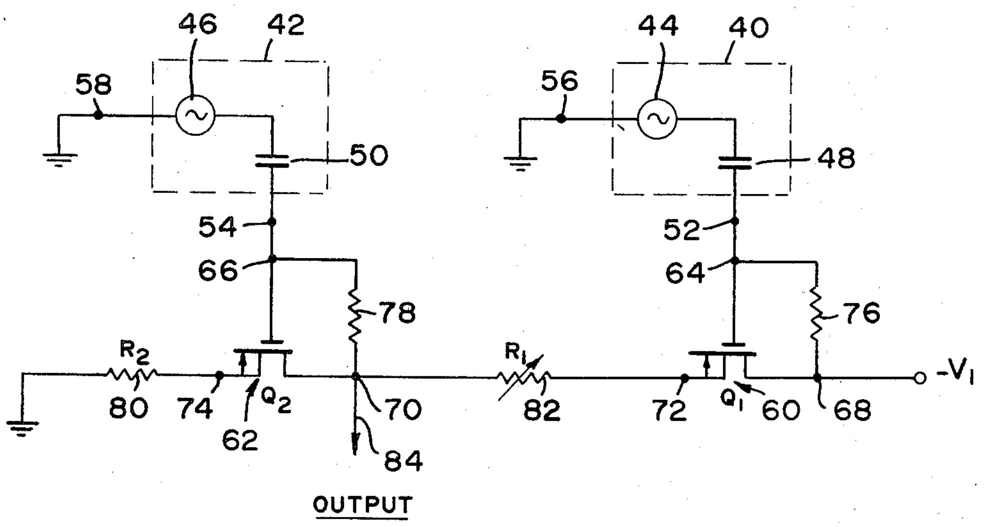
FIG. 2
INVENTOR.
JOHN R. MORRIS
BY [signature]
ATTORNEYS United States Patent Office 3,520,190
Patented July 14, 1970

3,520,190

DIFFERENCE CIRCUIT

T. O. Paine, Deputy Administrator of the National Aeronautics and Space Administration, with respect to an invention of John R. Morris, Los Angeles, Calif.

Filed May 21, 1968, Ser. No. 730,703
Int. Cl. G01v 7/00
U.S. Cl. 73—382 8 Claims

ABSTRACT OF THE DISCLOSURE

A circuit for providing an output signal proportional to the difference between two low-level voltage input signals. The circuit comprises two field effect transistors, each having its gate connected to one of two voltage input sources. The source-drain paths of the two field effect transistors are connected in series, with the output signal being provided at the junction of the two paths. The difference circuit finds particular use in conjunction with a device which measures the strength of a gravitational field by spinning a rotor having at least two arms. Strain gauges measure bending of the arms, and the circuit amplifies the low-level strain gauge outputs and provides a signal proportional to their difference.

ORIGIN OF INVENTION

The invention described herein was made in the performance of work under a NASA contract and is subject to the provisions of Section 305 of the National Aeronautics and Space Act of 1958, Public Law 85–468 (72 Stat. 435; 42 USC 2457).

BACKGROUND OF THE INVENTION

This invention relates to circuits for indicating the difference between two electrical inputs thereto.

Many devices require the use of difference circuits for generating an output proportional to the difference between two input signals. One application which requires a circuit of this type is a device for measuring gravitational fields. The device comprises a cross-like rotor which is rotated in the gravitational field to be measured. The gravitational field causes vibrations of the rotor arms. Strain gauges on the rotor arms generate signals indicating the amplitude of bending. The difference between the outputs of the strain gauges on the different arms indicates the strength of the gravitational field.

In the gravity measuring device, the outputs of the strain gauges are very small, being on the order of one-tenth microvolt with currents on the order of micro-microamperes. The difference between these two outputs must be transmitted by a radio transmitter in the rotor, because commutator-style devices would introduce vibrations. The entire circuitry for amplifying and transmitting must be very small to fit on the rapidly rotating rotor. Thus, a difference circuit of great simplicity is required having a very high input impedance and very low noise.

OBJECTS AND SUMMARY OF THE INVENTION

Accordingly, one object of the invention is to provide a simple difference indicating circuit having high input impedance, very low noise, small size, and low power requirements.

Another object of the invention is to provide an improved gravity measuring device.

In accordance with the present invention, a circuit is provided for generating a signal proportional to the difference between two inputs. The circuit is characterized by high input impedance, low noise, small size, and low power demand, and is useful in applications where the input signals are at an extremely low level. In one embodiment of the invention, the circuit employs two metal oxide silicon field effect transistors, whose gate terminals serve as the two input terminals of the circuit. The source-drain paths of the two field effect transistors are connected in series with each other and with a voltage source. Each of the transistors is connected to operate in an enhancement mode, with biasing provided by a resistor connected between its drain and gate terminals. The output of the circuit is taken at a point between the source-drain paths of the two transistors which are connected in series. This output is a voltage with an AC component substantially proportional to the difference between the voltage inputs at the gates of the transistors.

The circuit can be used to generate the difference between two strain gauge outputs, and finds particular use in a cross-shaped rotor for measuring a gravity field. The gauges are located on the arms of the rotor, and they measure the bending of the arms due to the field, as the rotor spins. The output of the circuit is delivered to the input of a radio transmitter for broadcast to a receiver located several inches away.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of a gravity-measuring device, employing the difference circuit of the invention; and FIG. 2 is a schematic diagram of one embodiment of the invention utilizing field effect transistors.

DESCRIPTION OF THE PREFERRED EMBODIMENTS

FIG. 1 illustrates a device for measuring the gravity field set up by a mass 10 such as a large brick of lead. The gravity measuring device comprises a cruciform-shaped rotor 12 having a hub 14 with four arms 16, 18, 20, and 22 radiating therefrom. A weight 24 is fixed to the end of each arm. Strain gauges 26, 28, 30, and 32 are attached to the sides of the arms to measure their bending. As the rotor rotates, the arms bend toward the mass. For a rotational speed which is one-half the resonant frequency of the arms, arm vibrations of appreciable magnitude will occur. Strain gauges 26 and 32 are connected in series, providing one output, while strain gauges 28 and 30 are connected in series to provide another output. A gravity field causes a particular mode of vibration and results in the output of each gauge in each pair of gauges adding, thereby providing an appreciable output from each pair. For most vibrations other than those due to a gravity field, the output of each gauge in a pair cancels, and each pair of gauges then provides a substantially zero output.

The natural or resonant frequency of the arms is a frequency such as 70 Hz. and therefore the rotor 12 rotates at one-half that speed, i.e. at 35 r.p.s. In order to measure very weak differences in gravitational fields, extraneous vibrations must be reduced to a minimum. The rotor is suspended and rotated by an electromagnet device 34, which supplies a magnetic field to support a bullet 36 of soft iron fixed to the hub of the rotor. The electromagnet increases and decreases in strength to suspend the rotor in a constant position in space, and it also provides a rotating field to rotate the rotor. The electrical outputs from the strain gauges cannot be readily connected to external devices because common mechanical connections such as commutators set up vibrations affecting the accuracy of gravitational measurements. External connections are provided by a radio transmitter within the hub 14 which transmits signals to a receiver at the base 38 of the apparatus.

The strength of the gravitational field is indicated by changes in the outputs of the strain gauge assemblies, each assembly comprising a pair of series connected strain gauges 26 and 32 or 28 and 30. An indication of the field strength can be most easily transmitted by first taking the difference between the outputs of the pairs of series-connected strain gauges, amplifying this difference and transmitting it. The outputs of the strain gauges are on the order of a tenth of a microvolt with currents on the order of micromicroamperes. One of the most difficult and critical portions of the circuitry within the rotor hub is the circuitry for generating a signal which is the amplified difference between the outputs of two pairs of strain gauges. Such a difference circuit must have a very high input impedance and low noise, and, in addition, must be small and simple in order to be accommodated in the hub of the rotor.

FIG. 2 is a schematic diagram of a difference circuit for generating a signal equal to the amplified difference between two low level inputs. The low level inputs may be those obtained from the pairs of strain gauges in the gravity measuring apparatus. The two pairs of strain gauges are indicated at 40 and 42, each pair having output characteristics which can be represented essentially by a voltage source 44 or 46 in series with a capacitor 48 or 50. One terminal 52 or 54 of each pair of strain gauges can be used as the output terminal of the gauges, while the other external terminal 56 or 58 can be grounded. The voltage sources 44 and 46 are alternating currents because the rotor to which the strain gauges are attached is rotating rapidly in a gravitational field.

The amplifying circuit comprises two field effect transistors $Q_1$ and $Q_2$ shown at 60 and 62, respectively, both being of the insulated gate field effect type. The particular transistors 60 and 62 are of the type which has an insulating layer of silicon dioxide and are generally referred to as metal oxide silicon field effect transistors (mosfet). Such transistors are characterized by an extremely high input impedance, such as a resistance of $10^{15}$ ohms and a capacitance on the order of one picofarad. Transistors 60 and 62 have gate terminals 64 and 66, drain terminals 68 and 70 and source terminals 72 and 74. The transistors are connected in an enhancement mode wherein they are self-biased at a gate-to-drain voltage of approximately 5 volts.

In the difference circuit of FIG. 2, the gate terminals 64 and 66 are biased to proper DC operating points by gate bias resistors 76 and 78 connected between the drain and gate terminals. The drain and source terminals, which are the output terminals of the transistors 60 and 62, are connected in series with each other and with resistor $R_2$ shown at 80, adjustable resistor $R_1$ shown at 82, and voltage source $-V_1$. The transistors are connected with the drain terminal 68 of the first transistor 60 connected to the negative voltage source $-V_1$. The source terminal 72 of the first transistor is connected to the drain terminal 70 of the second transistor through the variable resistor 82. The source terminal 74 of the second transistor is connected to ground potential through resistor 80.

The output of the circuit is taken over output line 84 which is connected to the drain terminal of the second transistor 62. This output line 84 carries a signal with an AC voltage which is proportional to the difference between the voltages of strain gauge sources 44 and 46. The output line 84 can carry significant amounts of current without appreciably affecting accuracy. The output at 84 is generally delivered to a voltage amplifier for for further boosting the signal amplitude before transmission.

The field effect transistors 60 and 62 function as though resistors were present between their drain and source terminals, but with each resistance varying in proportion to the signal voltage at the gate terminal. Thus, for a given voltage at the sources 44 and 46 of the strain gauges, the resistance between the output terminals 68 and 72 of the first transistor and the resistance between the output terminals 70 and 74 of the second transistor are constant. Accordingly, a particular current will flow from the voltage source $-V_1$ through first transistor 60, variable resistor 82, second transistor 62 and resistor 80 to ground.

If the voltage provided by the first strain gauge pair 40 decreases, this decrease is transmitted through its capacitor 48 to its output 52. This lowers the voltage at the gate terminal 64 of the first transistor. The greater negative voltage on the gate 64 lowers the resistance between the output terminals 68 and 72 of the first transistor 60, thereby reducing the voltage drop across it. As a result, the voltage at terminal 70 and output 84 will become more negative, decreasing toward the voltage $-V_1$.

If the voltage provided by the second strain gauge pair 42 decreases, the voltage on gate 66 of the second transistor decreases, and the resistance between the output terminals of the second transistor 62 decreases. This results in a smaller voltage drop across the second transistor 62, and therefore a greater voltage drop across the first transistor 60. This increases the voltage at the output 84.

As described above, a more negative voltage at the output of the first strain gauge pair 40 decreases the output voltage at 84, while a more negative voltage at the output of the second strain gauge pair 42 increases the voltage at output 84. Similarly, a more positive voltage at the first strain gauge pair 40 increases the voltage at output 84, while an increased voltage from the second strain gauge pair decreases it. Therefore, the change in output at 84 is directly proportional to the change in voltage at the first strain gauge pair 40 minus the change in voltage at the second strain gauge pair 42.

The biasing of each transistor is accomplished by a single gate resistor 76 or 78 connected between the drain and gate terminals. In the absence of such a resistor, the voltage at the gate terminal might remain at a level above that required to turn on the transistor. Then, the full source voltage for the circuit would be impressed across the transistor and no amplification would occur. The gate biasing resistor 76 allows the voltage of the gate 52 to decrease toward the voltage of the drain 68 and thereby turn on the transistor. The amount of current flowing between the source and gate terminals is extremely low, so that the voltage at the gate closely approaches the voltage at the drain even for an extremely high resistance gate resistor 76.

The gate bias resistors 76 and 78 can be of an extremely high value because the leakage currents from the gate are exceedingly small. The gate to source resistance is on the order of $10^{15}$ ohms, and also, very little current flows through the capacitances 48 and 50 of the strain gauge pairs for many types of ceramic gauges. These and other stray leakage paths are small enough that a gate bias resistor on the order of tens of megohms or higher can be used. A very high gate bias resistance of at least several megohms is desirable to maintain a high input impedance at the gate.

The variable resistance 82 can be used to change the gain of the lower transistor stage, which includes transistor 62. This is useful because it is difficult to obtain strain gauge pairs 40 and 42 or field effect transistors 60 and 62 of precisely matched characteristics. Increasing the resistance of the variable resistor 82 increases the gain of the lower stage which amplifies the output from the second strain gauge 42.

The AC characteristics of the circuit of FIG. 2 are given by the equation $$V_0=E_2\left[\frac{K_2R_1}{R_1+R_1-K_2R_2}\right]-E_1\left[\frac{K_1(K_2-1)R_2}{(K_1-1)(R_1+R_2R_2)}\right]$$

where $V_0$ is the AC voltage on output line 84, $E_1$ and $E_2$ are the instantaneous voltages of the strain gauge sources 44 and 46, respectively, and $K_1$ and $K_2$ represent the gains of transistors $Q_1$ and $Q_2$, respectively. The amplification of the voltages $E_1$ and $E_2$ will be equal if $K_1=K_2$ and $R_1=R_2$. However, the transistors may not be closely matched, and therefore the resistor $R_1$ is made variable to compensate for this. The value of the resistor $R_1$ is set so that $$R_1=R_2\frac{K_2(K_1-1)}{K_1(K_2-1)}$$

For example, if K can vary between 8 and 12, and $R_2$=47K ohms, then $R_1$ should have a range of 45K to 49.3K ohms.

A difference circuit has been constructed in accordance with the circuit shown in FIG. 2 using two type 2N3608 metal oxide silicon field effect transistors for the first and second transistors 60 and 62. The circuit also included gate resistances 76 and 78 of 100 megohms and a resistor 80 of 47K ohms. The variable resistor 82 was a trimpot which was variable over a range whose center was approximately 50K ohms. The voltage $-V_1$ was the negative terminal of a 22.5 volt battery whose positive terminal was grounded. The strain gauge pairs 40 and 42 were pairs of ceramic type gauges having effective capacitances, indicated at 48 and 50, of approximately 0.001 microfarad each. The rotor on which the strain gauges were attached rotated at approximately 35 r.p.s., so that the outputs of the strain gauges in response to gravitational fields were approximately 70 Hz. For the 0.001 microfarad capacitance of the strain gauges and a frequency of 70 Hz., the input impedance of the difference amplifier had to be substantially more than ½ $\pi$fc, or, in other words, substantially more than 2.3 megohms. The foregoing difference amplifier had a gain of approximately 10 and an input impedance of approximately 10 megohms. Its extreme simplicity, utilizing only 6 components, enabled it to be constructed with low weight and volume.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. A difference circuit for providing an output proportional to the difference between first and second inputs comprising:

a first field effect transistor having a gate terminal for connection to said first input, and drain and source output terminals;

a bias resistance connected between said gate terminal and said drain output terminal of said first transistor;

a second field effect transistor having a gate terminal for connection to said second input, and drain and source output terminals;

a bias resistance connected between said gate terminal and said drain output terminal of said second transistor;

a voltage source;

first means for connecting said voltage source between a first of said output terminals of said first transistor and a first of said output terminals of said second transistor;

second means for connecting a second of said output terminals of said first transistor to a second of said output terminals of said second transistor; and output means coupled to said second means.

2. A difference circuit as defined in claim 1 wherein:

said first means comprises a resistance;

said second means comprises a resistance; and at least one of said resistances of said first and second means is variable, whereby to vary the gain of said second transistor relative to said first transistor.

3. A difference circuit as defined in claim 1 wherein:

said first and second inputs have an output impedance of at least a megohm; and said first and second transistor means are insulated gate field effect transistors.

4. A difference circuit for generating signals indicating the difference between first and second inputs comprising:

a first metal oxide silicon field effect transistor;

a second metal oxide silicon field effect transistor;

coupling resistance means for coupling the source terminal of said first transistor to the drain terminal of said second transistor;

first and second bias resistance means, each coupling together the drain and gate terminals of one of said transistors;

voltage source means including a resistance on the order of magnitude of said coupling resistance means and having a negative terminal connected to said drain terminal of said first transistor and a positive terminal connected to said source terminal of said second transistor; and output means coupled to said coupling resistance means, whereby to deliver a voltage dependent upon the difference in voltages supplied to the gates of said first and second transistors.

5. A difference circuit as defined in claim 4 wherein: said first and second bias resistance means have resistances of more than several megohms.

6. A difference circuit as defined in claim 4 wherein:

said output means is connected substantially to the junction of said drain terminal of said second transistor and said coupling resistance means; and the resistance of said coupling resistance means $R_1$ and of said resistance $R_2$ of said voltage source means, is related to the gains $K_1$ and $K_2$ of said first and second transistors, respectively, by the relationship $$R_1=R_2\frac{K_2(K_1-1)}{K_1(K_2-1)}$$

7. In a device for measuring the difference in strains between two apparatuses by strain gauge assemblies attached to each of the apparatuses, said strain gauge assemblies having output impedances on the order of megohms, the improvement comprising:

first and second field effect transistors, each having gate, drain, and source terminals;

means coupling each of said strain gauge assemblies to one of said gate terminals;

first and second bias resistances, each having a resistance of at least several megohms and connected between the drain and gate terminals of one of said transistors for biasing the gate terminal thereof toward an operating point;

a first resistance connecting the source terminal of said first transistor to the drain terminal of said second transistor;

a voltage source having positive and negative terminals; and means including a second resistance, for coupling the drain terminal of said first transistor to said negative terminal and coupling the source terminal of said second transistor to said positive terminal.

8. The improvement defined in claim 7 including: means for varying the resistance of one of said resistances to vary the relative gains of the outputs of said strain gauge assemblies.

References Cited

UNITED STATES PATENTS

| | | | |
|---|---|---|---|
| 3,233,466 | 2/1966 | Shaw | 73—517 |
| 3,448,397 | 6/1969 | Hung Chang Lin et al. | 307—304 XR |
| 3,449,687 | 6/1969 | Knauber et al. | 330—38 XR |
| 3,452,287 | 6/1969 | Busch et al. | 330—38 XR |
| 3,454,894 | 7/1969 | Voorhoeve | 330—30 |

CHARLES A. RUEHL, Primary Examiner

U.S. Cl. X.R.

73—88.5; 330—38